March 20, 1956 W. H. BURKHART 2,739,299

MAGNETIC STORAGE SYSTEMS FOR COMPUTERS AND THE LIKE

Filed May 25, 1951 3 Sheets-Sheet 1

INVENTOR
WILLIAM H. BURKHART
BY William L. Lowe
AGENT

March 20, 1956 W. H. BURKHART 2,739,299

MAGNETIC STORAGE SYSTEMS FOR COMPUTERS AND THE LIKE

Filed May 25, 1951 3 Sheets-Sheet 2

INVENTOR
WILLIAM H. BURKHART
BY William S. Silver
AGENT

March 20, 1956 W. H. BURKHART 2,739,299

MAGNETIC STORAGE SYSTEMS FOR COMPUTERS AND THE LIKE

Filed May 25, 1951 3 Sheets-Sheet 3

INVENTOR
WILLIAM H. BURKHART
BY William L. Sloan
AGENT

United States Patent Office 2,739,299

Patented Mar. 20, 1956

2,739,299

MAGNETIC STORAGE SYSTEMS FOR COMPUTERS AND THE LIKE

William H. Burkhart, East Orange, N. J., assignor to Monroe Calculating Machine Company, Orange, N. J., a corporation of Delaware Application May 25, 1951, Serial No. 228,148

9 Claims. (Cl. 340—174)

This invention relates to electronic computers and more particularly to improved magnetic storage devices for use therein.

Prior computers have embodied a continuously rotating magnetic drum having on its periphery a number of circumferential channels each including a series of individually magnetizable cells or areas. Generally, a record and a playback magnet are provided for each channel, the former being so controlled as to magnetize a cell in either of two directions to indicate binary one or binary zero, and the latter being controlled in such manner that it can determine the polarity of a magnetized cell.

Magnetic drum storage systems of the type indicated are extremely useful in computers. However, it has been found that they have certain limitations and disadvantages. For example, the proximity, on a drum, of one or more channels in which information is constantly being recorded, with other seldom used channels, gives rise to objectionable radiated interference. Also the number of channels is limited, and, assuming that each channel is as narrow as practicable, can be increased only by the construction of a longer drum, which, of course, is an extremely expensive undertaking. Further, a limit is placed on the minimum delay time which can be obtained with the drum, by the spacing that is required between the record and playback magnets associated with a given channel.

The principal object of the invention, therefore, is the provision of an improved magnetic drum storage system for computers and the like which overcomes these and other limitations and disadvantages of the prior art and which broadens the field of utility of such systems.

The invention contemplates the indication of the binary digits 0 and 1 in a given channel cell by magnetizing the cell or not, respectively. That is, a magnetized cell indicates 1 and an unmagnetized cell indicates 0. This arrangement effects a considerable saving in the record and playback circuits in that no provision need be made to distinguish between magnetized cells of opposite polarity.

According to the invention, a magnetic storage drum is supplemented by any desired number of magnetic discs, each of which may have one or more storage channels on the periphery thereof and which, if desired, may be utilized in place of the drum, rather than in conjunction therewith. The discs may be driven in synchronism with the drum or not, as desired, and may be appropriately located to minimize radiated interference and wiring difficulties. Preferably, the recording of information on the disc and the playback thereof is controlled by pulses emanating from master channels on the drum.

In order to maintain the proper time relationship between the information on the drum and that on each disc even though a mechanical misalignment occurs, means are provided for erasing the information from the disc and re-recording it at the proper time during each cycle or disc revolution.

Means also are provided to precess information around the periphery of a disc, whereby, for example, the highest order digit of a number can be recorded at a given time during one cycle and then shifted to permit recording of the next lower order digit at the same time during a subsequent cycle.

Other objects and features of the invention will become apparent from the following description when read in the light of the attached drawings of which—

Before entering into a detailed description of the invention, it is deemed desirable first to define certain terms and symbols which are utilized throughout the description and drawings.

Figure 6:
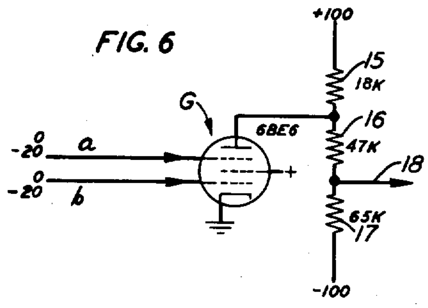
Fig. 6 is a circuit diagram of an "and gate" which in all of the other drawings is denoted merely by the symbol "G."

An "and gate," designated by the symbol G, may be any electronic device having two separate inputs each capable of assuming alternate states, said device producing a desired output only when both inputs simultaneously assume one of said states. For example, the pentode shown in Fig. 6 has its cathode grounded and its control and suppressor grids connected to separate control sources *a* and *b* which assume potentials of 0 volts and −20 volts. Obviously, the tube conducts only when both inputs are high (0 volts). The anode of the tube is connected to the juncture of the two positivemost sections 15 and 16 of a three section voltage divider 15, 16, 17 that is connected across a direct current source of + and −100 volts. The positive end of the most negative section 17 of the voltage divider provides a center tap for an output line 18 which, utilizing the components and values indicated in Fig. 6, assumes potentials of 0 volts when the tube is cut off and approximately −20 volts when the tube is conducting.

Figure 9:
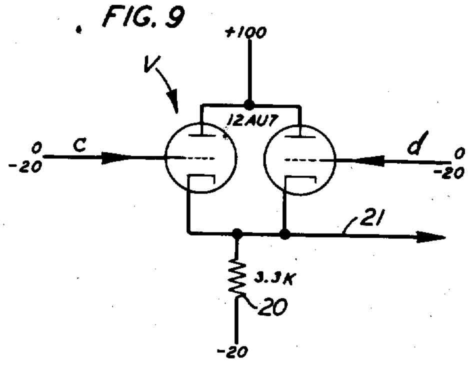
Fig. 9 is a wiring diagram of an "or gate" which in all of the other drawings is designated by the symbol "V."

An "or gate," designated by the symbol V, may be any electronic device having at least two separate inputs *c* and *d* each capable of assuming alternate states, said device producing a desired output when either of said inputs assumes one of said states. For example, the pair of triodes illustrated in Fig. 9 have their anodes commonly connected to a +100 volt source, and their cathodes commonly connected to a −20 volt source through a resistor 20. The grids of the two triodes are connected with separate control sources that assume potentials of 0 and −20 volts. An output line 21 is connected to the cathodes of the tubes, and, with potentials of −20 volts on the grids of both of the latter, assumes a potential of approximately −20 volts. If either grid is raised to 0 volt level, however, the output line potential is raised to approximately 0 volts also.

Figure 8:
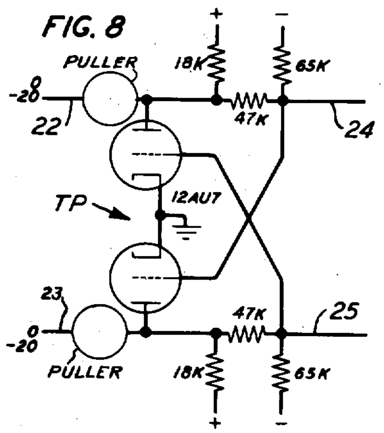
Fig. 8 is a wiring diagram of a trigger pair which is indicated by the symbol "TP" in all of the other drawings.

A trigger pair, designated by the symbol TP, is so well known that a description thereof is entirely unnecessary. For convenience however, one is illustrated in Fig. 8 in which the two input lines 22 and 23 and also the two output lines 24 and 25, alternately assume potentials of 0 and −20 volts. The input lines 22 and 23, of course, are applied to puller tubes which set and reset the trigger pair. Each puller may comprise a pentode of the type described above or a triode of the type to be described below, having its anode directly connected to that of a tube of the trigger pair.

Figure 7:
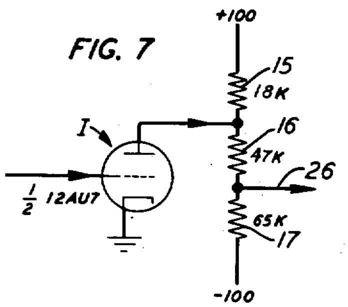
Fig. 7 is a wiring diagram of an inverter which in all of the other drawings is designated by the symbol "I."

An inverter, designated by the symbol I, may be any electronic device which, on application thereto of high and low potentials, delivers low and high potentials respectively. For example, the triode illustrated in Fig. 7 has its cathode grounded and its anode connected to a voltage divider in the same manner described above with reference to the "and gate" of Fig. 6. A high potential applied to the grid of the tube affects conduction and the potential of an output line 26 from the divider center tap, drops to approximately −20 volts. A negative potential (−20 volts) applied to the grid of the tube cuts off the latter and the potential of output line 26 rises to 0 volts.

The specific arrangements shown in Figs. 6–9 are the ones utilized in a preferred form of the invention, but it is to be understood, however, that other arrangements which satisfy the above definitions may be utilized in their places. For example, other types of "and" and "or" gates are disclosed in the copending application to Burkhart and Sepahban, Serial No. 189,922, now Patent No. 2,603,746.

Figures 1, 2:
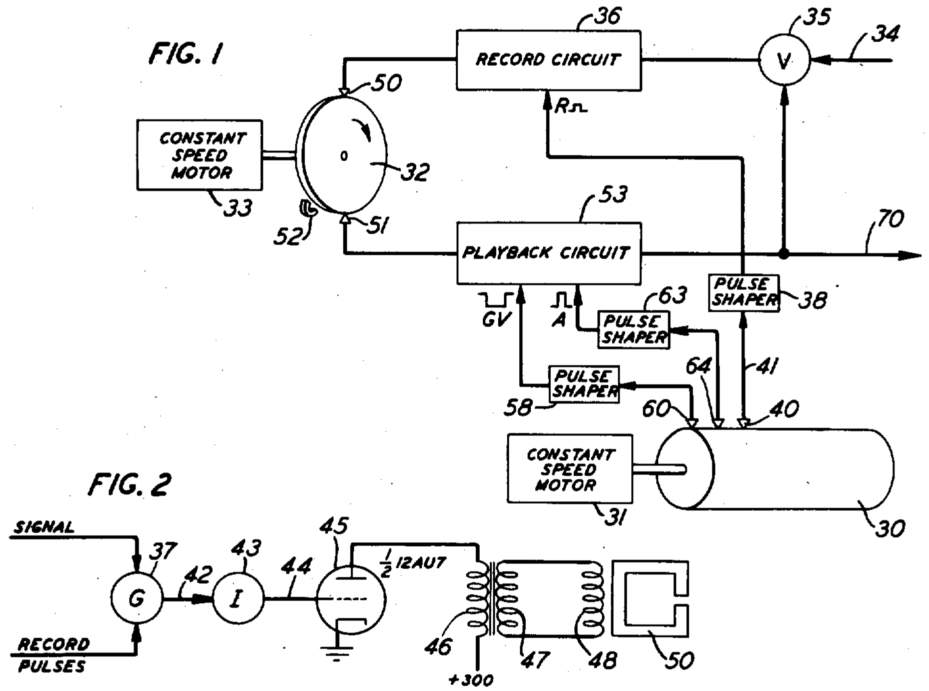
Fig. 1 is a diagrammatic illustration of a basic form of the magnetic recording system of the invention.
Fig. 2 is a partially diagrammatic wiring diagram of the record circuit of the system of Fig. 1.

A simple embodiment of the invention is illustrated in Fig. 1 and includes a magnetic drum 30 rotated continuously by a constant speed motor 31, and a magnetic disc 32 driven continuously by a constant speed motor 33. Drum 30 may be of the same sort as that disclosed in Patent No. 2,540,654 to A. A. Cohen et al. and like the latter may include a long series of circumferential recording channels, each having a homogeneous, magnetizable surface adapted to receive a predetermined number of discrete magnetizations. For convenience of description, a channel may be considered as being divided lengthwise into an appropriate number of individually magnetized cells, which, however, may creep lengthwise of the channel if the magnetizing means is not exactly synchronized with the angular velocity of the channel. Information may be recorded on the drum by magnetizing said cells selectively in the same manner as disclosed in the patent or in any other suitable manner. Preferably, however, the recording and playback means associated with the drum are so arranged that a magnetized cell indicates a binary 1 and a non-magnetized cell indicates a binary 0. No specific playback and recording means are associated with the drum in the drawing, but it will be understood that the recording and playback means which are illustrated as applied to the disc 32 may be applied also to each channel of the drum.

According to the invention the disc 32 may be of the same general construction as the drum, that is, it may be a non-magnetic wafer having a magnetic coating affixed to its periphery. If desired, each disc may be made sufficiently wide to embody a plurality of recording channels each comprising any desired number of cells, but, preferably, each disc embodies but a single channel having a predetermined number of cells. In the following description a disc channel is considered as having the same number of cells as a drum channel. A single disc 32 is shown associated with drum 30 in Fig. 1, but it will be understood that any number of said discs may be provided either associated with a drum or not, as desired. Further, each disc 32 may be driven from an individual source or all may be driven from a common source, or, if desired, the discs and the drum may be driven from a common source.

According to the invention, the disc 32 may be driven at the same speed as the drum 30 in order that, theoretically, a given point on the periphery of the disc will always be at the same angular position as a similar point on the periphery of the drum; or the disc may be driven at a different speed so that a given point on the periphery thereof has a different angular velocity than a similar point on the periphery of the drum. For example, in some instances, it is desired that information be recorded on drum 30 for the purpose of delaying it a certain number of time periods. When the number of time periods is small, this may be impossible due to the bulk of the record and playback magnets associated with a given drum channel and the spacing required therebetween. However, the information may be recorded on a disc 32 that is rotating at a higher rate of speed which, in effect, is the same as moving the record and playback magnets closer together. For example, if the physical bulk of the recording and playback means associated with a given channel is of sufficient magnitude to make it impossible to playback data recorded in the channel after a delay of less than say four time periods and yet it is desired to playback such data after a delay of only two time periods, the said channel may be replaced by a magnetic disc which is rotated at double the speed of the drum including the said channel. Thus, although the recording and playback magnets are not located closer together, the increased speed in rotation of the disc moves a spot recorded by the recording magnet to the playback magnet for comparison therewith in two time periods. In like manner, it is possible to reduce the minimum time delay to one time period by rotating the disc at four times the speed of the drum. In the following description, the disc 32 and the drum 30 will be considered to be rotating at the same speed.

Referring to Fig. 1, information from any suitable source is transmitted over an input line 34 to an "or gate" 35 and thence to a record circuit 36 which may be of the sort shown in Fig. 2. As shown, the recording circuit includes an "and gate" 37 into which the information signal is fed and into which record pulses R from a pulse shaper 38 are also fed. Pulse shaper 38 may be of any suitable sort that emits pulses R of the character indicated in Fig. 5, and is controlled by a master record control channel of drum 30, the cells in said channel magnetized to effect energization of pulse shaper 38 once for each cell of disc 32 through a playback magnet 40 and a line 41. Simultaneous occurrence of an information signal and a record pulse at the "and gate" 37, momentarily lowers the potential of the output line 42 of the latter. Output line 42 controls an inverter 43 which is cut off by the drop in potential thereof. This raises the potential of the output line 44 of said inverter and effects conduction of a triode 45 whose grid is connected to said line. The anode of triode 45 is connected through a transformer coil 46 with a source of positive potential, and conduction of the tube results in a potential drop across said coil. This induces a voltage in secondary coil 47 which is connected with the winding 48 of a record magnet 50 that is situated adjacent the periphery of disc 32 in the manner described in the above mentioned patent. Obviously, energization of a magnet 50 will magnetize the channel cell of disc 32 which is situated adjacent thereto at the time of energization.

It will be seen, therefore, that during each cycle of disc 32 and drum 30, the record magnet 50 is energized each time a signal is fed through "or gate" 35 to "and gate" 37 in coincidence with the application of a record pulse R to said gate 37. To effect simultaneous arrival of input signals and record pulses R, at gate 37, the source of the former may be controlled by a timing channel or channels on drum 30 or by any other suitable timing medium.

Figure 5:
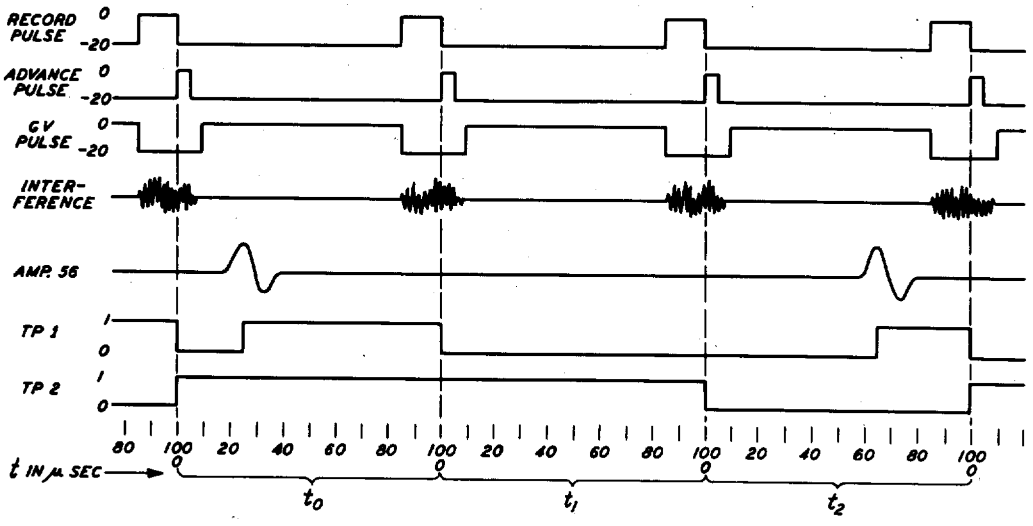
Fig. 5 is a timing chart which illustrates the mode of operation of the means of the invention.

At this point it is deemed desirable to describe the timing arrangement utilized with disc 32 and drum 30 in the illustrated instance of the invention. The disc channel and each channel of the drum include one hundred eighty individually magnetizable cells and each of the former is considered as passing the record magnet 50 during a time period $t_0$, $t_1$, $t_2$ . . . $t_{179}$. For convenience of description, each said time period may be considered as having a duration of one hundred microseconds. As indicated in Fig. 5, the record pulses R may have a duration of fifteen microseconds, and may occur at the end of each time period.

Figures 10, 11:
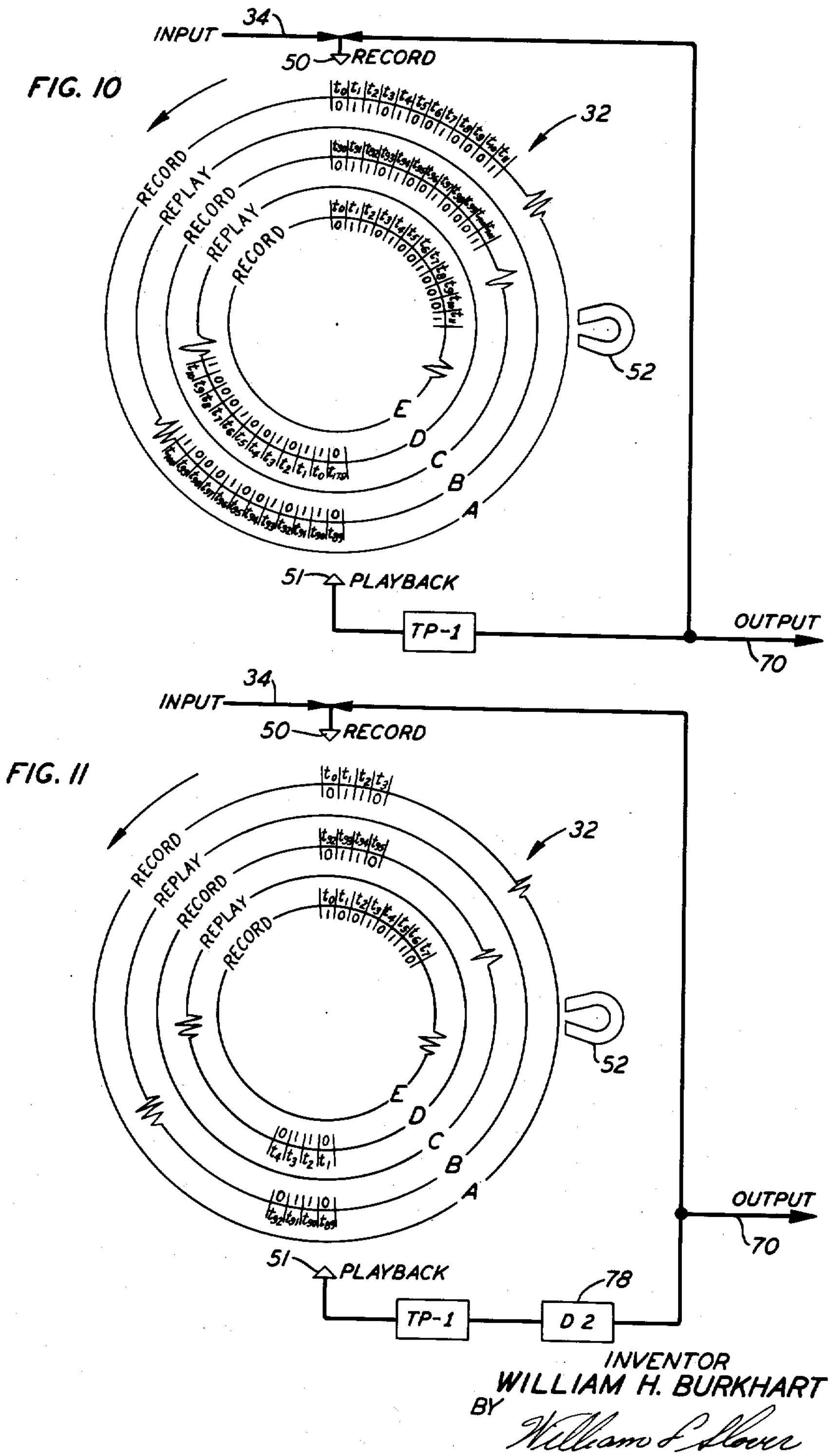
Fig. 10 is an operation diagram which illustrates a sample operation of the means of Fig. 1.
Fig. 11 is an operation diagram which illustrates a sample operation of the means of Fig. 4.

Disc 32 also has associated therewith a playback magnet 51 and an erase magnet 52 which may be a permanent magnet. Playback magnet 51 may be positioned, angularly, anywhere desired so as to obtain any desired delay time between record and playback. The erase magnet, of course, is placed beyond the playback magnet in the direction of rotation of the disc. In the present instance, record magnet 50 and playback magnet 51 are located eighty-nine time periods apart, that is, information recorded on disc 32 by magnet 50 during time period $t_0$ is played back by playback magnet 51 during time period $t_{89}$, and is erased at some later time by permanent magnet 52. From the playback magnet 51, information is fed through a playback unit 53 which, as will presently be described, delays the information an additional time period, and thence back to the "or gate" 35 during time period $t_{90}$. This effects a re-recording of the information by magnet 50 during time period $t_{90}$. The re-recorded information is played back a second time by magnet 51 during time period $t_{179}$, is delayed an additional time period by playback unit 53, and is recorded for the third time during time period $t_0$ of the following cycle of the disc. This is illustrated in the chart of Fig. 10 wherein the digits 6, 9 and 8 in binary form are initially recorded on the disc during time periods $t_0$, $t_1$, . . . $t_{11}$ (circle A) are re-recorded during time periods $t_{90}$, $t_{91}$, . . . $t_{101}$ (circle C), and are recorded a third time during time periods $t_0$, $t_1$, . . . $t_{11}$ of the following cycle of the disc (circle E).

It will be seen, therefore, that information recorded on disc 32 during a specific time period is re-recorded on the disc during the same time period of each succeeding cycle. As will be explained hereinafter, this arrangement is extremely helpful in correcting slight misalignments in the timing of the disc with respect to the drum due to some mechanical lag of one or the other.

Figure 3:
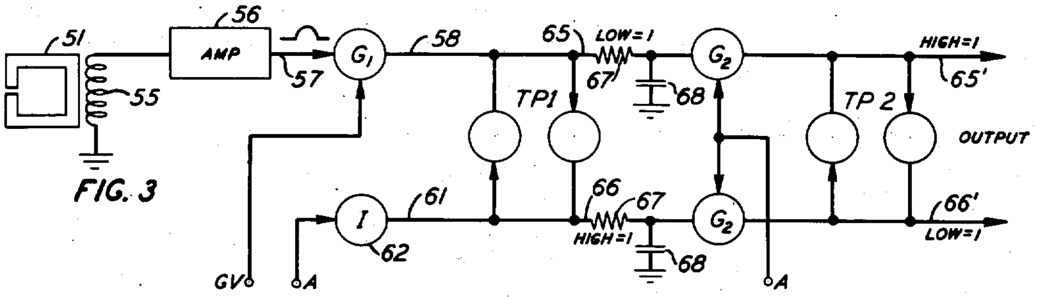
Fig. 3 is a partially diagrammatic wiring diagram of the playback circuit of this system of Fig. 1.

The playback unit is illustrated in Fig. 3 and includes a coil 55 for magnet 51 in which a slight voltage is induced when a magnetized cell of the disc passes the pole pieces of the magnet. The coil is connected to ground at one side and to an amplifier 56 at the other. Amplifier 56 may be of any suitable sort adapted to produce on its output line 57 a pulse adapted to affect an "and gate" $G_1$ in the manner set forth above. Gate $G_1$ is also controlled by negative pulses GV of the sort indicated in Fig. 5 which are produced by a suitable pulse shaper 58 under control of a playback magnet 60 associated with a control channel of drum 30. This channel has its cells magnetized so as to effect production of a GV pulse during each time period $t_0$, $t_1$, . . . $t_{179}$. Obviously, gate $G_1$ produces a low output only when the amplifier pulses on line 57 occur between successive GV pulses. Referring to Fig. 5, it will be seen that the GV pulses occur at the same time as the record pulses, but have almost double the duration of the former, say, twenty-five microseconds. Thus, the playback unit is maintained disabled for the duration of each record pulse R and for a similar length of time thereafter so that radiated interference from the recording means which normally occurs during that time as shown in Fig. 5, is ineffective to cause a spurious operation of the playback unit. Referring to Fig. 5, it will be seen that in the present instance, the twenty-five microsecond length of the GV pulses allows the playback unit to be operated by a pulse from amplifier 56 that occurs anytime during a seventy-five microsecond portion of each one hundred microsecond time period. Preferably, playback magnet 51 is positioned so as to be affected by a magnetized cell at the center point of a said seventy-five microsecond interval if ideal synchronism exists.

The ouput line 58 (Fig. 3) of gate $G_1$, which, it will be remembered, is driven low when magnet 51 senses a magnetized cell of disc 32, is connected to one input of a trigger pair $TP_1$. The other input of the trigger pair $TP_1$ is connected to the output 61 of an inverter 62 which is operated by an advance pulse A that occurs at the beginning of each time period immediately after the record pulse R for the preceding time period (Fig. 5). For operation as pullers, gate $G_1$ and inverter 62 obviously are not provided with voltage dividers but rather utilize those of the trigger pair. The advance pulses A are formed by a suitable pulse shaper 63 (Fig. 1) which is controlled by a playback magnet 64 associated with a control channel on drum 30. This channel also has each cell magnetized so as to effect the production of an advance pulse A for each time period $t_0$, $t_1$, . . . $t_{179}$. Referring to Fig. 5, it will be seen that the positive surge of an advance pulse A effects conduction of the inverter 62 and lowers the potential of its output line 61 to set $TP_1$ in 0 indicating position. Trigger pair $TP_1$, therefore, is positively set during the GV pulse time at the very beginning of each time period $t_0$, $t_1$, . . . $t_{179}$, so that the potential drop of the output line 58 of gate $G_1$ (Fig. 3) later in the time period resets the trigger to indicate 1 (Fig. 5). If playback magnet 51 does not sense a magnetized cell and no pulse is produced by amplifier 56, then the potential of line 58 does not drop and the trigger $TP_1$ is not reset, but remains set in zero position. This is illustrated in Fig. 5 wherein, at the beginning of a first time period $t_0$, the trigger pair $TP_1$ is set to zero position under control of the advance pulse A and is later reset to indicate 1 under control of a pulse from amplifier 56. At the beginning of a second time period $t_1$, trigger pair $TP_1$ is again set to indicate 0 under control of the advance pulse A, but, as no pulse is produced by amplifier 56, remains set in zero position.

The output lines 65 and 66 of trigger pair $TP_1$ (Fig. 3) each has a resistor 67 inserted therein and each is connected with one input of "and gate" $G_2$. A condenser 68 is connected from each resistor 67 to ground. Each resistor 67, condenser 68, combination, provides a time constant which affects the rate at which a potential change of the associated trigger pair output line 65 or 66 is reflected on the input of a gate $G_2$. The gates $G_2$ are also controlled by the advance pulses A described above, so that during a said advance pulse, the gate whose other input is at a high potential due to the setting of trigger pair $TP_1$, conducts. As described above, trigger pair $TP_1$ is set to its zero position during each time period $t_0$, $t_1$, . . . $t_{179}$ by an advance pulse A, resulting in that the potentials of the output lines 65 and 66 of said trigger pair may be changing at the very time that the initial potentials are supposed to affect the gates $G_2$. As shown in Fig. 5, the advance pulses A are of short duration, say, five microseconds. By choosing appropriate values for resistor 67 and condenser 68, a large time constant, say forty microseconds, can be obtained, resulting in that only a very small percentage of the potential change on a line 65 or 66 is reflected on the input of the associated gate $G_2$ during the time span of the advance pulse A. Thus, it is the state of trigger pair $TP_1$ prior to each advance pulse A that controls the operation of the gates $G_2$ during said advance pulse. This delay arrangement is fully described and claimed in the co-pending application, Serial Number 220,846 to W. Burkhart now Patent Number 2,601,089.

Assuming that trigger pair $TP_1$ is set to indicate 1, output line 66 (Fig. 3) is at a high potential, and at the occurrence of an advance pulse A, the associated gate $G_2$ conducts. The outputs of gates $G_2$ control a second trigger pair $TP_2$, and the latter is set to indicate 1 or 0 in accordance with the setting of trigger pair $TP_1$ during the preceding time period $t_0$, $t_1$, . . . $t_{179}$. In the above example in which output line 66 of trigger pair $TP_1$ has a high potential to indicate 1, the conduction of the associated gate $G_2$ and the consequent drop in potential of its output, flips trigger $TP_2$ to its 1 position in which its output line 65' is high and its output line 66' is low. Preferably, output line 65' of trigger $TP_2$ is connected back to "or gate" 35 (Fig. 1) in order to deliver said high potential to "and gate" 37 (Fig. 2) of the record circuit for utilization on the occurrence of the record pulse R at the end of the time period.

Referring now to Fig. 5, trigger pair $TP_1$ is shown as being in its 1 position just prior to the beginning of time period $t_0$, and trigger pair $TP_2$ is shown as being in its 0 position at that time. At the beginning of said time period $t_0$, the occurrence of advance pulse A flips trigger $TP_1$ to its 0 position and flips trigger $TP_2$ to the 1 position which the former trigger pair had been in previously. A short time later in the time period, a pulse from amplifier 56 flips trigger $TP_1$ to its 1 position. Trigger pair $TP_2$, however, is not affected at this time. At the beginning of the following time period $t_1$, the advance pulse A flips trigger $TP_1$ to its 0 position but trigger $TP_2$, which is already in 1 position, is not affected. No pulse from amplifier 56 is received during time period $t_1$, so the trigger pair $TP_1$ remains unchanged. On the occurrence of advance pulse A at the beginning of the next time period $t_2$ trigger $TP_1$ which is in its 0 position is not affected but trigger pair $TP_2$, which is in its 1 position, is flipped to its 0 position. Late in time period $t_2$, a pulse from amplifier 56 flips trigger $TP_1$ to its 1 position but does not affect trigger pair $TP_2$, the latter remaining in its 0 position until the occurrence of the advance pulse at the beginning of the next following time period.

It is to be noted that pulses from amplifier 56 control the setting of trigger $TP_1$ and that the setting of $TP_2$ is, in turn, controlled by the setting of the former ($TP_1$). With this arrangement, a pulse from amplifier 56 may occur at any time during a time period, excepting, of course, the time occupied by a GV pulse, and will set trigger $TP_1$ immediately. However, trigger pair $TP_2$ whose output is fed back to the record circuit, is set and reset at exactly the same time during each time period, that is, at the beginning of each advance pulse A, which occurs immediately following the record pulse R for the preceding time period. This arrangement allows of a considerable time misalignment between disc 32 and drum 30 (in the present instance, 37.5 microseconds in either direction from an ideal central point as determined by the positioning of playback magnet 51) due to some mechanical lag of one or the other.

In order to utilize information stored on disc 32, the output of playback circuit 53 is delivered not only to "or gate" 35, but also to an output line 70 which may lead to any suitable device and which may, if desired, be the output line 66' of trigger pair $TP_2$ which otherwise is unused. For example, output line 70, or 66', may control one or more record circuits associated each with a channel of drum 30.

When the information on disc 32 is no longer needed, it may be canceled by disabling pulse shaper 38 which produces the record pulses R, for one-half a cycle or longer. This prevents the re-recording of information played back by unit 53 and said information is thus not re-recorded after it is erased by magnet 52.

Figure 4:
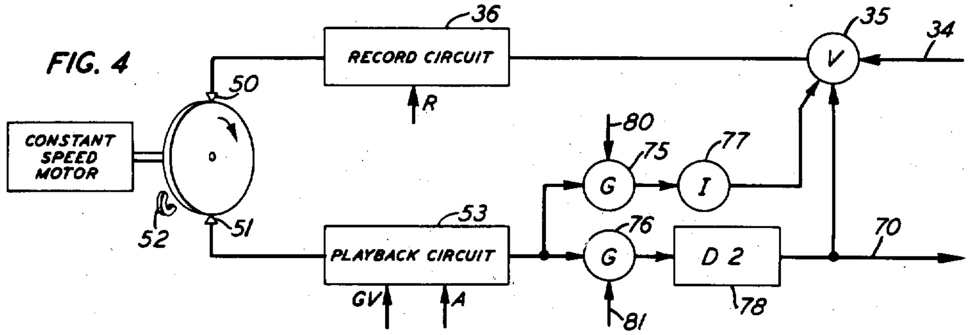
Fig. 4 is a fragmentary diagrammatic view similar to Fig. 1 but illustrating a modified arrangement.

Referring now to Figs. 4 and 11, wherein like parts are given the same reference numerals as hereinabove, there is disclosed a slight modification of the system of Fig. 1, whereby the several digits of a multi-digit decimal number can be recorded in binary form on disc 32 during the same time periods of each of a series of cycles which may be successive or not, as desired, each digit after having been recorded on the disc during a specific four time periods, being erased and re-recorded thereon during a different set of four time periods to allow of the recording of the next digit during the said specific four time periods of a subsequent cycle.

As shown in Fig. 4, playback circuit 53 feeds into a pair of "and gates" 75 and 76. Gate 75 has its output connected through an inverter 77 to the "or gate" 35. When gate 75 is effective, the operation of the system is the same as described above, that is, a high potential applied to gate 75 effects a low potential of its output which cuts off inverter 77 and applies a high potential to "or gate" 35. The secondary control for gate 75 will be discussed later. Gate 76 feeds a delay circuit 78 adapted to delay information for two time periods. Circuit 78 may, if desired, include two trigger pairs interconnected in the same manner as trigger pairs $TP_1$ and $TP_2$ of Fig. 3. The output of this delay circuit 78 is delivered to "or gate" 35. Preferably, the outputs of delay circuit 78 are segregated from those of inverter 77 by increasing the capacity of "or" gate 35 to three inputs (three triodes) and applying the outputs of the two circuits to separate inputs of the gate as indicated in Fig. 4. Obviously, information recorded on disc 32 during, say, time period $t_0$ and played back during time period $t_{89}$ is not re-recorded until time period $t_{92}$, being delayed one time period in the playback circuit as described above and being delayed two time periods by delay circuit 78; and the second re-recording of the information occurs during time period $t_4$ of the following cycle.

Gates 75 and 76 are provided with enabling controls 80 and 81, respectively, which determine which of the two will conduct upon delivery of a high potential from playback circuit 53. Input lines 80 and 81 may be controlled in any suitable fashion as, for example, by a keyboard or by a control channel on the drum. In the present instance, it will be assumed that gate 75 is operative at all times save for a cycle in which an input signal is delivered to "or gate" 35 of line 34. For example, the depression of a keyboard key to deliver a desired signal on line 34 may also apply a low potential to input line 80 of gate 75 and a high potential to input line 81 of gate 76, said lines normally being in the opposite states. With this arrangement, an operation such as that indicated in Fig. 11 can be performed. As shown on circle A, the digit 6 in binary form is recorded on disc 32 during time periods $t_0$, $t_1$, $t_2$ and $t_3$ (circle A). This information is played back during time periods $t_{89}$, $t_{90}$, $t_{91}$, and $t_{92}$ (circle B), and is re-recorded during time periods $t_{92}$, $t_{93}$, $t_{94}$ and $t_{95}$ (circle C). The information is played back a second time during time periods $t_1$, $t_2$, $t_3$ and $t_4$ of the second cycle (circle D), and is recorded again during time periods $t_4$, $t_5$, $t_6$ and $t_7$ of said second cycle (circle E). During time periods $t_0$, $t_1$, $t_2$ and $t_3$ of said second cycle, however, the digit 9 in binary form, for example, may also be recorded. Thus, the disc has the digits 6 and 9 recorded thereon during time periods $t_0, t_1, \ldots t_7$. During said second cycle, the information is advanced in the same manner and eventually is recorded during time periods $t_4, t_5, \ldots t_{11}$ of the third cycle. If no input occurs on line 34 during the third cycle, gate 76 is disabled and gate 75 enabled and the information on the disc will remain in the same time positions until a signal on said line does occur during some subsequent cycle, the same as illustrated in the chart of Fig. 10.

It will readily be seen that the several digits of a multi-digit number can be recorded on disc 32 seriatim and that when all of the digits have been recorded, they can be stored for any desired length of time. When it is desired to utilize said number, the same may be fed out of the circulatory recording system to the utilization device rather than be fed back to the recording unit. This may be accomplished in the same manner as described above, in which instance the several digits will be fed to the utilization device during a single cycle of disc 32; or a number may be fed out at a rate of one digit per cycle. This latter operation can be accomplished by disabling gate 75 and enabling gate 76 so that the recorded number advances, in time, one digit per cycle. Timed means may be associated with the output line 70 (Fig. 4) to allow delivery of information to the utilization device only during a particular group of four time periods. For example, if a number is recorded on disc 32 during time period $t_0$, $t_1$, . . . $t_{11}$, then the said timed means may be set to pass information during time periods $t_{12}$, $t_{13}$, $t_{14}$ and $t_{15}$ of each cycle. Obviously one digit of the number will advance into time periods $t_{12}$, $t_{13}$ $t_{14}$ and $t_{15}$ during each cycle of the disc and will be passed on to the utilization device by said timing means.

Other arrangements for controlling the emission of information from disc 32 may also be provided.

It is to be pointed out that, whereas in the present instance a magnetic disc is associated with a magnetic drum for timing control purposes, one or more discs may be utilized with any device adapted to produce the described timing control pulses (A, R and GV), and to differentiate between the several time periods $t_0$, $t_1$, . . . $t_{179}$ of each disc cycle for purposes of precessing information around the disc in the manner described above, and for reading a desired bit of information out of the system during the particular set of time periods allotted to playing back said bit of information. For example, a suitable pulse generator may be provided with a counter which identifies each time period $t_0$, $t_1$, . . . $t_{11}$.

While there have been above described but a limited number of embodiments of the invention, it is to be understood that there are many other changes and rearrangements thereof than can be made without departing from the scope of the invention as set forth in the following claims or as dictated by the prior art.

I claim:

1. The combination with a rotating magnetic drum having thereon a plurality of peripheral storage channels each comprising a series of individually magnetizable cells, and playback means for each of one or more of said channels in which the cells are magnetized to produce timing signals, of a magnetic disc rotated in timed relation to the drum and having thereon a peripheral storage channel also comprising a series of individually magnetizable cells, a record circuit to magnetize the disc cells selectively, including an "and gate" to accept record signals, a playback circuit for sensing magnetized disc cells, including an "and gate" to accept playback signals, a trigger pair set to one state on conduction of the last said gate, a puller tube to reset the trigger pair to the opposite state, a pair of "and gates" controlled by the outputs of said trigger pair, a second trigger pair pulled to opposite states by said "and gate" pair, and control means operated by said timing signals to enable said "and gates" and operate said puller, said control means effecting enabling of the playback circuit "and gate" only when the record circuit "and gate" is disabled, operating the puller prior to each enabling of the playback circuit gate, and enabling said "and gate" pair at the time of operation of the puller.

2. The combination with a rotating magnetic drum having thereon a plurality of peripheral storage channels each comprising a series of individually magnetizable cells, and playback means for each of one or more of said channels in which the cells are magnetized to produce timing signals, of a magnetic disc rotated in timed relation to the drum and having thereon a peripheral storage channel also comprising a series of individually magnetizable cells, a record circuit to magnetize the disc cells selectively, including an "and gate" to accept record signals, a playback circuit for sensing magnetized disc cells, including an "and gate" to accept playback signals, pulse producing means operated by said timing signals to enable said record circuit gate for each disc cell and to disable the playback circuit gate while the record circuit gate is enabled and for a similar period of time thereafter, a trigger pair set to one state on conduction of the playback gate, a puller tube to reset the trigger pair to the opposite state, operated by said pulse producing means while said playback circuit gate is disabled, a pair of "and gates" enabled by said pulse producing means coincidently with the operation of said puller and made conductive alternatively by said trigger pair, and a second trigger pair pulled to opposite states by said gate pair.

3. The combination with a rotating magnetic drum having thereon a plurality of peripheral storage channels each comprising a series of individually magnetizable cells, and playback means for each of one or more of said channels in which the cells are magnetized to produce timing signals, of a magnetic disc rotated in timed relation to the drum and having thereon a peripheral storage channel also comprising a series of individually magnetizable cells, a record circuit to magnetize the disc cells selectively, including an "and gate" to accept record signals, a playback circuit for sensing magnetized disc cells, including an "and gate" to accept playback signals, pulse producing means operated by said timing signals to enable said record circuit gate for each disc cell and to disable the playback circuit gate while the record circuit gate is enabled and for a similar period of time thereafter, a trigger pair set to one state on conduction of the playback gate, a puller tube to reset the trigger pair to the opposite state, operated by said pulse producing means while said playback circuit gate is disabled, a pair of "and gates" enabled by said pulse producing means coincidently with the operation of said puller and made conductive alternatively by said trigger pair, and a second trigger pair pulled to opposite states by said gate pair, and having an output line thereof coupled back to the record circuit.

4. The combination with a rotating magnetic drum having thereon a plurality of peripheral storage channels each comprising a series of individually magnetizable cells, and playback means for each of one or more of said channels in which the cells are magnetized to produce timing signals, of a magnetic disk rotated in synchronism with the drum and having thereon a peripheral storage channel also comprising a series of individually magnetizable cells, a record circuit to magnetize the disc cells selectively, including an "and gate" to accept record signals, a playback circuit for sensing magnetized disc cells, including an "and gate" to accept playback signals, pulse producing means operated by said timing signals to enable said record circuit gate for each disc cell and to disable the playback circuit gate while the record circuit gate is enabled and for a similar period of time thereafter, a trigger pair set to one state on conduction of the playback gate, a puller tube to reset the trigger pair to the opposite state, operated by said pulse producing means while said playback circuit gate is disabled, a pair of "and gates" enabled by said pulse producing means coincidently with the operation of said puller and made conductive alternately by said trigger pair, a second trigger pair pulled to opposite states by said gate pair, and a delay circuit connecting an output of said second trigger pair back to said record circuit.

5. In a magnetic storage system, the combination of a uniformly rotating member having on its periphery one or more storage channels each comprising a series of individually magnetizable cells, a normally disabled record circuit for magnetizing said cells selectively in accordance with record signals, timed means for enabling said record circuit at the appropriate time for magnetizing each of said cells, a normally enabled playback circuit to sense for each magnetized cell during a definite time interval to allow for deviations in the rate of rotation of the member, timed means to disable the playback circuit while the record circuit is enabled and for a similar time thereafter, a storage circuit having its output connected to the record circuit to control the latter, and timed means to set said storage circuit in the state assumed by the playback circuit during the preceding said time interval, said timed means being in fixed time relation to one another.

6. In the playback unit for a storage channel of a rotating member, which comprises a series of individually magnetizable cells, means for sensing said channel for magnetized cells during a succession of time periods, one period for each cell, an "and gate", means effective to cause said gate to conduct on sensing of a magnetized cell any time during a major portion of each time period, a trigger pair set to one state on conduction of said gate, a puller tube effective to set said trigger pair to the opposite state at the beginning of each time period, a pair of "and gates," a source of time reference signals to enable said gate pair at a predetermined time during each time period, said gates being made conductive alternately at said predetermined times by said trigger pair and a second trigger pair set to opposite states by said gate pair.

7. In the playback unit for a storage channel of a rotating member, which comprises a series of individually magnetizable cells, means for sensing said channel for magnetized cells during a succession of time periods, one period for each cell, an "and gate," means effective to cause said gate to conduct on sensing of a magnetized cell any time during a major portion of each time period, an alternate state storage element set to one state on conduction of said gate, timed means to set said element to the opposite state between successive said major time period portions, a second alternate state storage element, and means under control of said timed means and the first said storage element to set said second storage element at a predetermined point in each time period.

8. The combination of a magnetic disc rotating at a constant speed and having thereon a peripheral storage channel comprising a series of individually magnetizable cells, a pulse generator for emitting control pulses for each said cell and including means for distinguishing the cells one from another, a record circuit to magnetize the disc cells selectively, including an "and gate" to accept record signals, a playback circuit for sensing magnetized cells, including an "and gate" to accept playback signals, and timed means under control of the pulse generator for enabling and disabling said "and gates" for each cell, said timed means effecting enabling of the playback circuit "and gate" only after the record circuit "and gate" has been disabled for a period of time that is comparable to the period for which it was enabled.

9. Means for storing information for short periods of time which are below the minimum limit possible with a magnetic drum rotating at a given angular velocity, including one or more magnetic discs, each having thereon a storage channel comprising a series of individually magnetizable cells and each driven at a higher angular velocity than the drum, record and playback means associated with each disc and timing control means regulating operations of said record and playback means, said drum including one or more tracks having synchronizing recordings therein to control said timing means.

References Cited in the file of this patent

UNITED STATES PATENTS

| | | |
|---|---|---|
| 2,540,654 | Cohen et al. | Feb. 6, 1951 |
| 2,549,071 | Dusek et al. | Apr. 17, 1951 |
| 2,564,403 | May | Aug. 14, 1951 |
| 2,587,532 | Schmidt | Feb. 26, 1952 |
| 2,591,931 | Grosdoff | Apr. 8, 1952 |
| 2,594,731 | Connolly | Apr. 29, 1952 |
| 2,609,143 | Stibitz | Sept. 2, 1952 |
| 2,609,439 | Marshall | Sept. 2, 1952 |
| 2,611,813 | Sharpless | Sept. 23, 1952 |
| 2,614,169 | Cohen et al. | Oct. 14, 1952 |
| 2,617,704 | Mallina | Nov. 11, 1952 |

OTHER REFERENCES

Investigations for Design of Digital Calculating Machinery, Nov. 10, 1948, Progress Report #2, pp. 5–9 (Precession Experiment), issued by the Computation Lab. of Harvard University.

Booth: "A Magnetic Digital Storage System," Electronic Engineering, pages 234–238, July 1949.